(12) United States Patent  
Ono et al.

(10) Patent No.: US 8,452,838 B2  
(45) Date of Patent: May 28, 2013

(54) MULTIMODAL SERVICE SESSION ESTABLISHING AND PROVIDING METHOD, AND MULTIMODAL SERVICE SESSION ESTABLISHING AND PROVIDING SYSTEM, AND CONTROL PROGRAM FOR SAME

(75) Inventors: Yoshihiro Ono, Tokyo (JP); Kazuhiro Takahashi, Tokyo (JP); Takehiko Kashiwagi, Tokyo (JP); Takashi Shiraki, Tokyo (JP); Kouichi Funaya, Tokyo (JP)

(73) Assignee: NEC Corporation, Tokyo (JP)

( * ) Notice: Subject to any disclaimer, the term of this patent is extended or adjusted under 35 U.S.C. 154(b) by 874 days.

(21) Appl. No.: 11/385,221

(22) Filed: Mar. 21, 2006

(65) Prior Publication Data

US 2006/0225117 A1    Oct. 5, 2006

(30) Foreign Application Priority Data

Mar. 31, 2005    (JP) ................................. 2005-104435

(51) Int. Cl.
- *G06F 15/16*    (2006.01)
- *G06F 15/173*    (2006.01)
- *H04L 12/28*    (2006.01)
- *G06Q 10/10*    (2006.01)

(52) U.S. Cl.
CPC .................................... *G06Q 10/10* (2013.01)
USPC ........... 709/205; 709/204; 709/226; 709/227; 370/351

(58) Field of Classification Search
USPC .... 709/204, 205, 226, 227; 370/351; 725/117
See application file for complete search history.

(56) References Cited

U.S. PATENT DOCUMENTS

| | | | |
|---|---|---|---|
| 5,440,624 A * | 8/1995 | Schoof, II | 379/202.01 |
| 6,624,827 B1 * | 9/2003 | Hwang et al. | 715/753 |
| 6,807,529 B2 * | 10/2004 | Johnson et al. | 704/270.1 |
| 2004/0078468 A1 | 4/2004 | Hedin et al. | |
| 2004/0190489 A1 | 9/2004 | Palaez et al. | |
| 2005/0021616 A1 | 1/2005 | Rajahlme et al. | |
| 2005/0021826 A1 * | 1/2005 | Kumar | 709/232 |
| 2005/0138219 A1 * | 6/2005 | Bou-Ghannam et al. | 710/1 |
| 2006/0031294 A1 * | 2/2006 | Poikselka | 709/204 |

FOREIGN PATENT DOCUMENTS

| | | |
|---|---|---|
| JP | H08-153072 | 6/1996 |
| JP | H09-054741 | 2/1997 |
| JP | 10-232899 | 9/1998 |
| JP | 2005-519363 | 6/2000 |
| JP | 2000-250864 | 9/2000 |
| JP | 2004-165742 | 6/2004 |
| JP | 2004-265096 | 9/2004 |

OTHER PUBLICATIONS

Nakamura, M. et al., *A Study of Multimedia Service Composition Mechanism*, IEICE Technical Report, Mar. 1996, pp. 2-6, vol. 95, No. 577.

WO/2003/073198 published Sep. 4, 2003, English abstract only.

\* cited by examiner

*Primary Examiner* — Peter Shaw

(74) *Attorney, Agent, or Firm* — Scully, Scott, Murphy & Presser PC

(57) ABSTRACT

A multimodal service establishing method is provided which is capable of achieving flexible combinations of a plurality of service contents. At least one integrated server is installed between a plurality of terminal devices and service servers of a plurality of types. A session establishment processing unit and service linking processing unit are mounted in the integrated server. The session establishment processing unit establishes multimodal service session between terminals and service servers. After the establishment of multimodal service session, the service linking processing unit provides new service obtained by linking and integrating service to be provided by service servers, that is, multimodal service to terminal devices.

1 Claim, 10 Drawing Sheets

MULTIMODAL SERVICE SESSION ESTABLISHING AND PROVIDING METHOD, AND MULTIMODAL SERVICE SESSION ESTABLISHING AND PROVIDING SYSTEM, AND CONTROL PROGRAM FOR SAME

BACKGROUND OF THE INVENTION

1. Field of the Invention

The present invention relates to a multimodal service session establishing method, a multimodal service providing method, a multimodal service session establishing system, a multimodal service providing system, and programs for the same, and more particularly to the multimodal service session establishing method, the multimodal service providing method, the multimodal service session establishing system, the multimodal service providing system, and programs for the same, each of which is capable of almost removing mutual dependence on software among terminals and service servers.

The present application claims priority of Japanese Patent Application No. 2005-104435 filed on Mar. 31, 2005, which is hereby incorporated by reference.

2. Description of the Related Art

A conventional multimodal service providing system is already known. Its example is a teleconferencing system (hereinafter called a "conventional teleconferencing system"). The conventional teleconferencing system is so configured that a plurality of terminal devices (hereinafter called simply a "terminal") that join teleconference is connected through a network to a teleconferencing system server. In the terminal is installed a program of a teleconferencing system application and in the teleconferencing system server are installed a telephone application program and/or white board sharing application program.

A request for using multimodal service to be issued by users who are using terminals of a conventional teleconferencing system reaches, through program processing of a teleconferencing system application installed in terminals, a teleconferencing system server where programs of the telephone application and/or white board shared application are executed, based on the request, to provide multimodal service desired by users to users of terminals.

A service linking system is disclosed in Patent Reference 1 (Japanese Patent Application Laid-open No. Hei 10-232899) which integrates a plurality of basic service contents to provide virtual service. In the disclosed service linking system, virtual service that is to be provided to users is defined in advance and each of basic service objects of basic service making up the virtual service is driven, based on the definition, in a specified order and, as a result, the virtual service object for the virtual service is generated and, when the generated virtual service object is executed, individual basic service is integrated by operations of users as virtual service and the integrated virtual service is provided to users.

A service linking system is disclosed in Patent Reference 2 (Japanese Patent Application Laid-open No. 2004-265096) in which each of service contents to be provided by a plurality of servers is linked according to system environments of each server. In the service linking system, based on master information managed by a service pattern managing means (service pattern managing section) and information about newest connecting states with a plurality of servers being managed, at specified intervals, by a server state managing means (server state managing section), the service pattern managing means generates a newest service pattern and, based on server availability and its threshold value, a service generating means (service generating section) selects the service that can be provided to users, out of newest service patterns generated by the service pattern managing means, to generate service for provision to users.

A group communication system is disclosed in Patent Reference 3 (Japanese Patent Application Laid-open No. 2004-165742) in which, by controlling a distributing path to be used by user terminals for communications depending on an increase or decrease in the number of users who join a group communication, a user terminal can join the group communication sequentially or can break away from the communications. When a session information registering terminal making up the group communication system registers session information on a session information server, the session information server assigns a session identifier to the session information registering terminal. The session information registering terminal sequentially notifies each of user portable terminals that join a session of the assigned session identifier and these user terminals, by using the received session identifier, registers its own distributing path information on the session information server and each of the user terminals acquires distributing path information of other user terminal from the session information server. This enables the user terminal to join the session. To break away from the session, the user terminal transmits a request for deletion of the distributing path information and an event for the deletion and then the session information server generates new distributing path information in response to the deletion request and renews the distributing path information while the user terminal updates the distributing path information in the same way. This allows the user terminal to break away from the session.

However, the conventional technologies described above have problems. That is, in the example of the teleconferencing system, due to a close relation between the teleconferencing system application program of a terminal to be used for provision of multimodal service and the white board shared application program, addition of application program for new service to the teleconferencing system server is not easy. That is, if the system remains unchanged, provision of new service obtained by integration of existing application (service) and other application (service) is very difficult.

In the service linking system disclosed in the Patent Reference 1, each of the basic service objects is made to be sequentially driven based on the definition of virtual service to generate a virtual service object and, while the generated virtual service object is being performed and each of the basic service contents is being provided by users, these basic service contents are integrated into virtual service contents for provision to users and, therefore, a specified link is established among objects of a plurality of basic service contents and those of the virtual service contents, which, as a result, makes it difficult to integrate service other than basic service that has already been built-in.

In the service linking system disclosed in Patent Reference 2, a plurality of service patterns is generated by using master information managed by the service pattern managing means and service that can be provided to users is selected out of the plurality of service patterns and is generated to provide it to users and, therefore, though it is described in the Patent Reference 2 that a plurality of service contents is linked in this system, the master information itself serving as a source of the service patterns to be generated is managed by the service pattern managing means and there is no method that allows users to participate in the generation of the service patterns, which disables the service linking in which users takes the initiative.

In the group communication system disclosed in the Patent Reference 3, the session information registering terminal registers session information on the session information registering terminal. The session information registering terminal sequentially notifies an assigned identifier to each of user terminals that join the session and the user terminals register, by using the received session identifier, its own distributing path information on the session information server and each of user terminals acquires distributing path information of other user terminal from the session information server. This shows that the user terminals can join the session. However, in the case where the session is, for example, a teleconference, an integrated form of a plurality of media to be transmitted or received among user terminals is not described specifically and, therefore, it is assumed that the applied technology follows the conventional one, which causes conventional technological problems remain unsolved. This is also true for the breaking away from the group communications.

SUMMARY OF THE INVENTION

In view of the above, it is an object of the present invention to provide a multimodal service session establishing method, a multimodal service session system, and control program for the same, each of which is capable of establishing a multimodal service session by almost removing mutual dependence on software between terminals and service servers. It is another object of the present invention to provide a multimodal service providing method, a multimodal service providing system, and control program for the same, each of which is capable of providing mulimodal service to terminals by almost removing mutual dependence on software between terminals and service servers.

According to a first aspect of the present invention, there is provided a multimodal service session establishing method for establishing a multimodal service session between service servers and terminal devices by connecting service servers of a plurality of types each providing a different service content to terminal devices and by integrating service to be provided by two or more service servers selected out of the service servers of a plurality of types to provide the integrated service to the terminal devices, the multimodal service session establishing method including:

issuing a session establishing request from the terminal devices when the integrated service is to be provided; and establishing the multimodal service session between the terminal devices and the service servers to which the session establishing request is issued, based on the session establishing request issued.

In the foregoing, a preferable mode is one wherein an address of each of the service servers from which service is to be received or a name of service to be provided by each of the service servers is contained in the session establishing request.

Also, a preferable mode is one wherein the multimodal service session is established by issuing the session establishing request so that the session establishing request contains group identifying information used to identify terminal devices that join the multimodal service session and by making corresponding the service servers issue a session start request to the terminal devices, based on the group identifying information contained in the session establishing request.

According to a second aspect of the present invention, there is provided a multimodal service providing method for providing multimodal service by connecting service servers of a plurality of types each providing a different service content to terminal devices and by integrating service to be provided by two or more service servers selected out of service servers of a plurality of types to terminal devices, the multimodal service providing method including:

issuing a session establishing request from the terminal devices when integrated service is to be provided;

establishing the multimodal service session between the terminal devices and the service servers to which the session establishing request is issued, based on the session establishing request issued;

monitoring, after the multimodal service session is established, significant information representing states of service to be provided by the service servers and sent-out information fed from the terminal devices when the integrated service is to be provided;

determining a manner of linking of service, based on results from the monitoring and service linking conditions set in advance;

making the service be linked, based on the determined linking manner; and providing the linked and integrated service to the terminal devices.

In the foregoing, a preferable mode is one wherein the significant information is control information of service to be provided by the service servers or state information of service to be provided by the service servers.

Also, a preferable mode is one wherein the control information is information showing that the terminal devices have acquired floor-rights for service to be provided by the service servers.

Also, a preferable mode is one wherein the sent-out information is specifying information to specify contents of service to be provided by pertinent service servers for every service server.

Furthermore, a preferable mode is one wherein the specifying information is voice speech information, white board writing instruction, or video image.

According to a third aspect of the present invention, there is provided a multimodal service session establishing system including:

service servers of a plurality of types each providing a different service content;

terminal devices to be connected to the service servers of a plurality of types;

integrated servers installed between the terminal devices and the service servers of a plurality of types;

wherein a multimodal service session to provide service to the terminal devices by integrating service to be provided by two or more service servers selected out of the service servers of a plurality of types is established between the service servers and the terminal devices;

wherein the terminal devices issue a session establishing request when the integrated service is to be provided; and wherein the integrated servers establish the multimodal service session between the terminal devices and the service servers to which the session establishing request is issued, based on the session establishing request issued.

In the foregoing, a preferable mode is one wherein each of the integrated servers includes:

an analyzing unit to analyze the session establishing request issued by the terminal devices;

a first issuing unit to issue, based on a result from the analysis by the analyzing unit, a first session start request to be transmitted to the service servers for every service server a receiving unit to receive response information to the session start request to be returned back from the service servers; and a second issuing unit to issue, based on the response information to be received by the receiving unit, a second session start request to be transmitted to the terminal devices.

Also, a preferable mode is one wherein an address of each of the service servers from which service is to be received or a name of service to be provided by each of the service servers is contained in the session establishing request.

Also, a preferable mode is one wherein the terminal devices are so configured as to issue the session establishing request containing group identifying information to specify terminal devices that join the multimodal service session and wherein a group managing server is mounted as one of the service servers of a plurality of types and wherein the integrated servers inquire of the group managing server about each of the terminal devices identified by group identifying information, based on the group identifying information contained in the session establishing request to be received from the terminal devices and, based on results from the inquiry, issue the first session start request to the service servers to establish the multimodal service session.

Furthermore, a preferable mode is one wherein the terminal devices are so configured as to issue the session establishing request containing group identifying information to specify terminal devices that join the multimodal service session and wherein a group managing server is mounted as one of the service servers of a plurality of types and wherein the integrated servers, based on the session establishing request fed from the terminal devices, issue a session start request containing group identifying information to the service servers of a plurality of types and the service servers of a plurality of types, based on group identifying information contained in the session start request, inquire of the group managing server about each of the terminal devices identified by the group identifying information and issue, based on results from the inquiry, the second session start request to the terminal devices to establish the multimodal service session.

According to a fourth aspect of the present invention, there is provided a multimodal service providing system including:

service servers of a plurality of types each providing a different service content;

terminal devices to be connected to the service servers of a plurality of types;

integrated servers installed between the terminal devices and the service servers of a plurality of types;

wherein service is provided to the terminal devices by integrating service to be provided by two or more service servers selected out of the service servers of a plurality of types;

wherein the terminal devices issue a session establishing request when the integrated service is to be provided;

wherein the integrated servers includes:

a session establishing unit to establish the multimodal service session between the terminal devices and the service servers to which the session establishing request is issued, based on the session establishing request issued by the terminal devices;

a monitoring unit to monitor, after the multimodal service session has been established by the session establishing unit, significant information representing states of service to be provided by the service servers and sent-out information fed from the terminal devices when the integrated service is to be provided;

a storing unit to store service linking conditions set in advance;

a determining unit to determine a manner of service linking based on results from the monitoring by the monitoring unit and on service linking conditions of the storing unit;

an issuing unit to issue the manner of service linking determined by the determining unit to the service servers;

wherein the service to be provided by the service servers of a plurality of types is linked, based on the manner of linking issued by the issuing unit, and the linked and integrated service is provided to the terminal devices.

In the foregoing, a preferable mode is one wherein the significant information is control information of service to be provided by the service servers or state information of service to be provided by the service servers.

Also, a preferable mode is one wherein the control information is information showing that the terminal devices have acquired floor-rights for service to be provided by the service servers.

Also, a preferable mode is one wherein the sent-out information is specifying information to specify contents of service to be provided by pertinent service servers for each of the service servers.

Also, a preferable mode is one wherein the specifying information is voice speech information, white board writing instruction, or video image.

Also, a preferable mode is one wherein information about service linking is determined according to a specified relationship between the significant information and the sent-out information.

Also, a preferable mode is one wherein the service servers include a floor server, voice transferring server, and white board application server.

Furthermore, a preferable mode is one wherein the service servers include a session storing server.

According to a fifth aspect of the present invention, there is provided a control program to make a computer execute the multimodal service session establishing method described above.

According to a sixth aspect of the present invention, there is provided a control program to make a computer execute the multimodal service providing method described above.

According to a seventh aspect of the present invention, there is provided a control program to make a computer execute the multimodal service session establishing system described above.

According to an eighth aspect of the present invention, there is provided a control program to make a computer execute the multimodal service providing described above.

With the above configurations, prior to integration of service to be provided by two or more service servers out of a plurality of types of service servers and provision of the service to terminal devices, a session establishing request is issued from the terminal devices and, based on the issued session establishing request, multimodal service session is established between the terminal devices and service servers to which the session establishing request is transferred via integrated servers connected between the terminal devices and service servers and then service to be provided by each service server is integrated in a manner to be linked with integrated server service and, therefore, mutual dependence on software between the terminals and service servers is almost removed, which can achieve flexible combination between a plurality of existing service contents and new service contents.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. The multimodal service providing system of the present invention is so configured that integrated servers are installed between a plurality of types of service servers and terminal devices and multimodal service session is established via the integrated servers and, in the multimodal service session, service to be provided by each service servers is integrated in a manner to be linked with integrated server service.

First Embodiment

Figure 1:
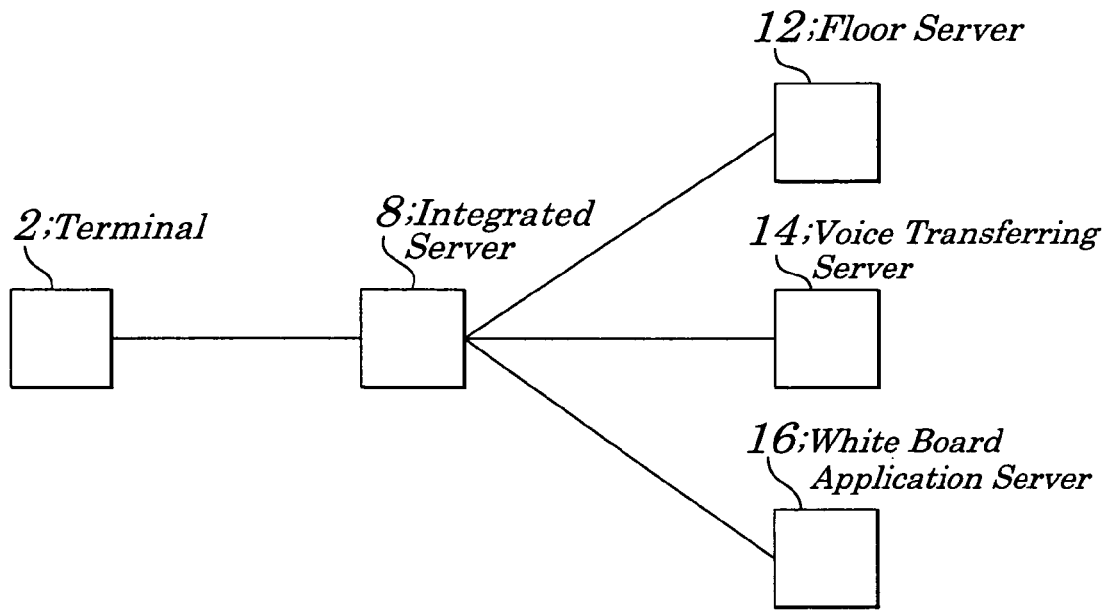
FIG. 1 is a diagram showing basic configurations of a multimodal service providing system according to a first embodiment of the present invention.
Figure 2:
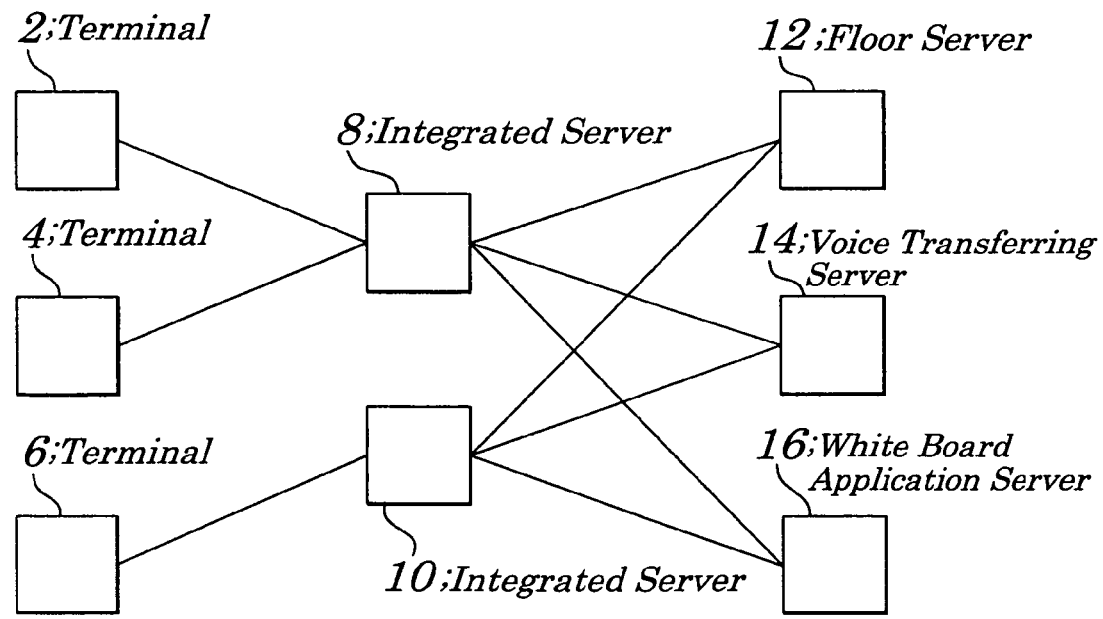
FIG. 2 is a diagram showing specified configurations of the multimodal service providing system according to the first embodiment of the present invention.
Figure 3:
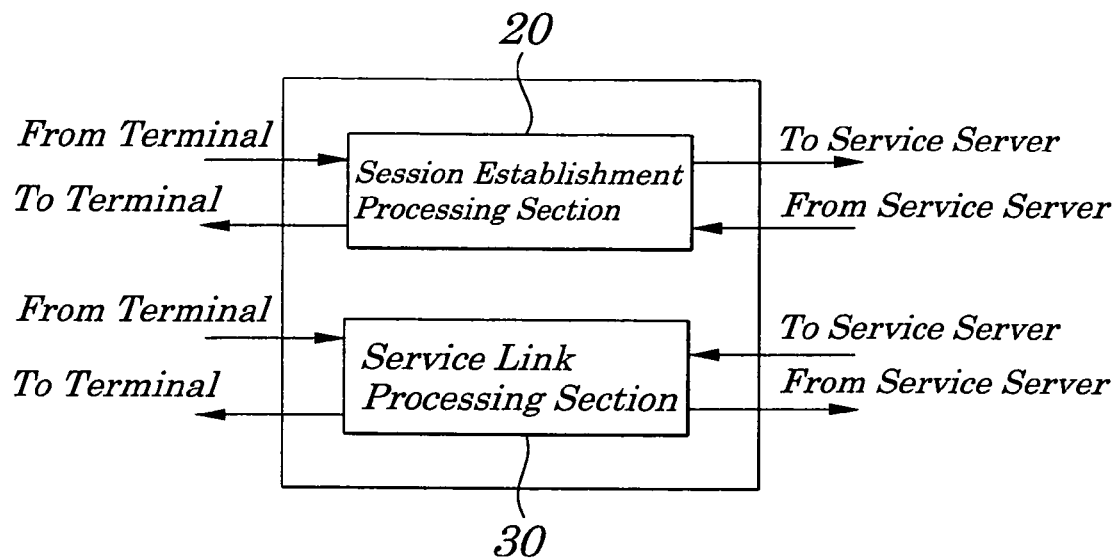
FIG. 3 is a diagram showing configurations of integrated servers of the multimodal service providing system according the first embodiment of the present invention.
Figure 4:
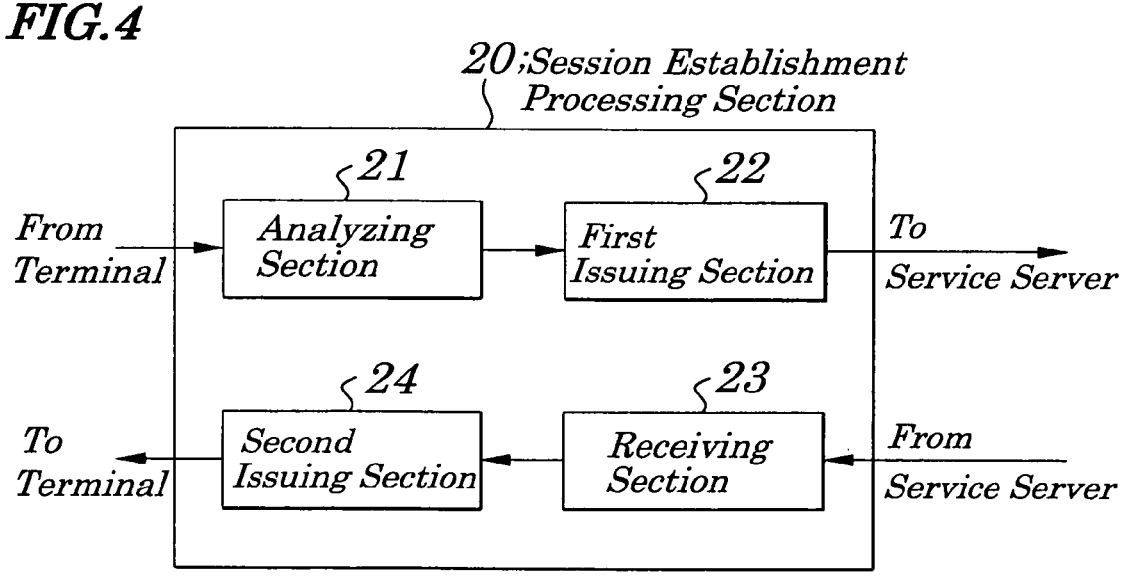
FIG. 4 is a diagram showing configurations of a session establishment processing section making up each of integrated servers of the multimodal service providing system according to the first embodiment of the present invention.
Figure 5:
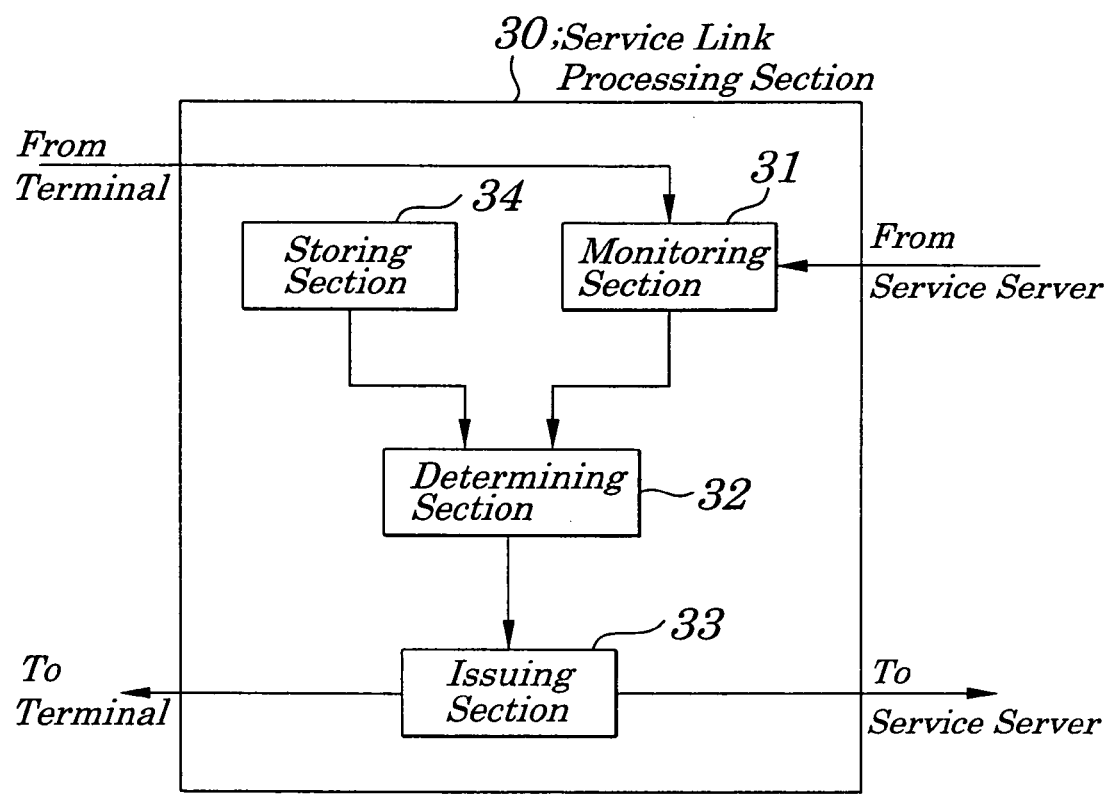
FIG. 5 is a diagram showing configurations of a service link processing section making up each of the integrated servers of the multimodal service providing system according to the first embodiment of the present invention.
Figure 6:
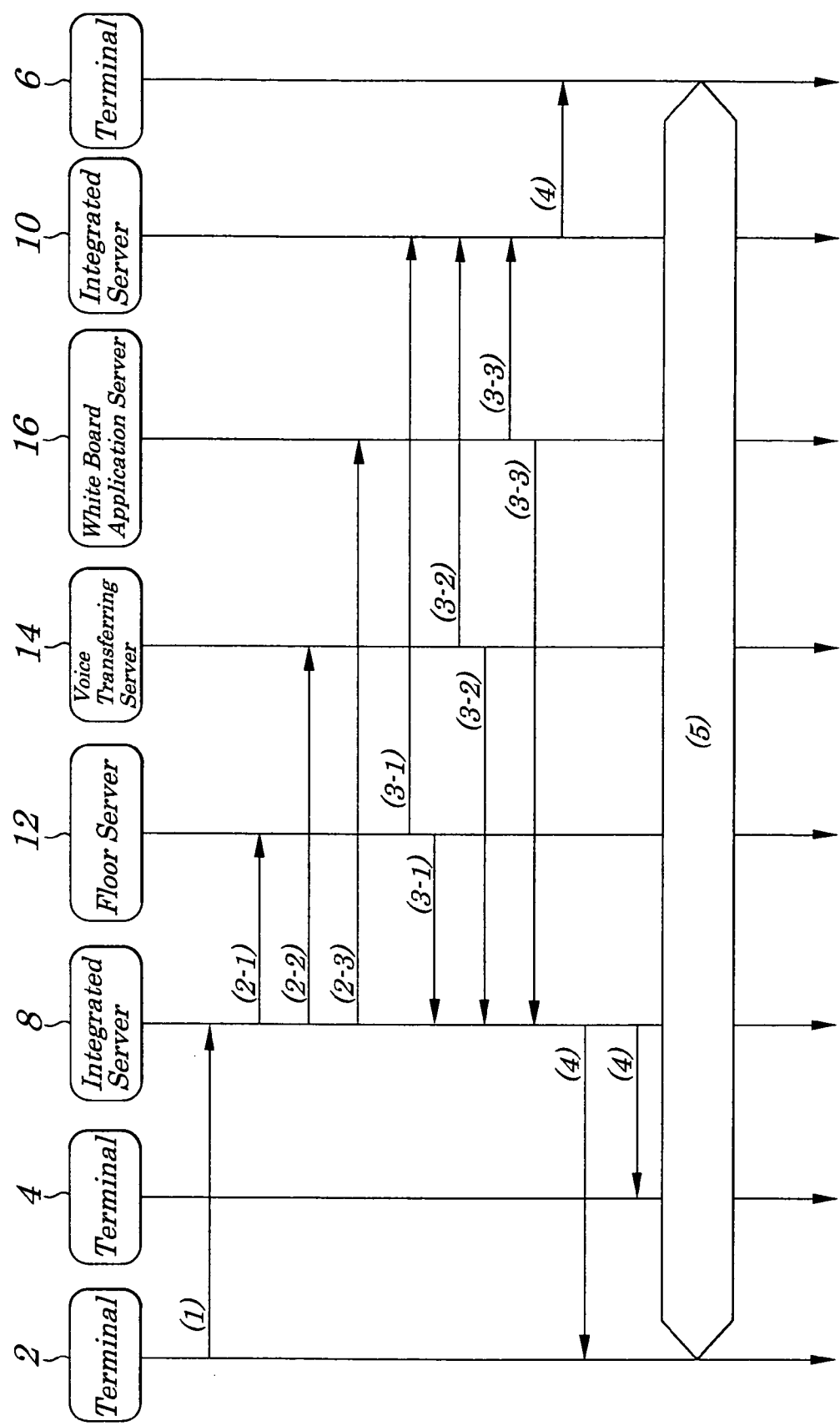
FIG. 6 is a timing chart occurring at time of the establishment of a session of the multimodal service providing system according to the first embodiment of the present invention.
Figure 7:
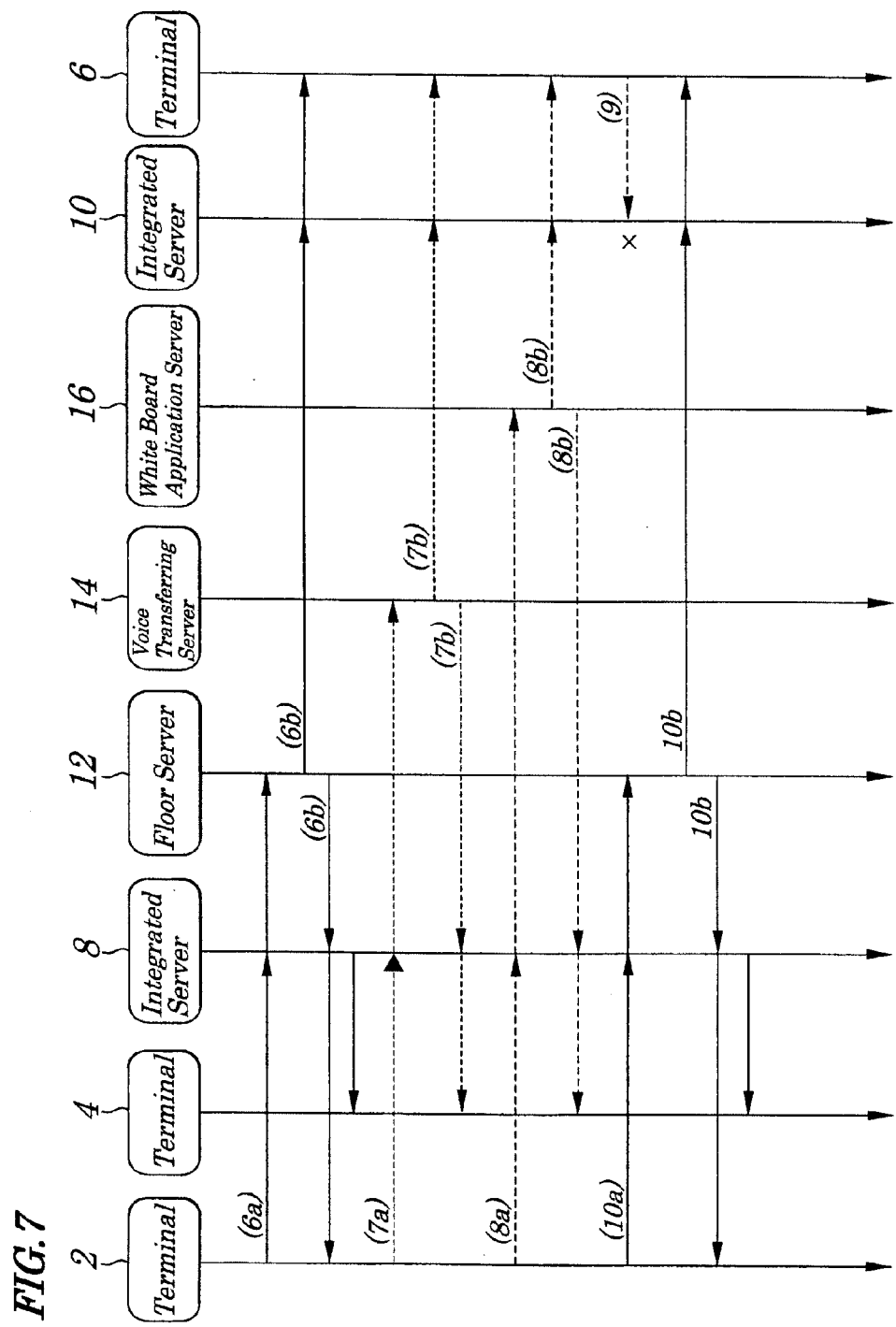
FIG. 7 is a timing chart occurring during time of the session of the multimodal service providing system according to the first embodiment of the present invention.

FIG. 1 is a diagram showing basic configurations of a multimodal service providing system of a first embodiment of the present invention. FIG. 2 is a diagram showing specified configurations of the multimodal service providing system of the first embodiment. FIG. 3 is a diagram showing configurations of integrated servers of the multimodal service providing system of the first embodiment. FIG. 4 is a diagram showing configurations of a session establishment processing section making up each of the integrated servers of the multimodal service providing system of the first embodiment. FIG. 5 is a diagram showing configurations of a service link processing section making up each of the integrated servers of the multimodal service providing system of the first embodiment. FIG. 6 is a timing chart occurring at time of the establishment of a session of the multimodal service providing system of the first embodiment. FIG. 7 is a timing chart occurring during time of the session of the multimodal service providing system of the first embodiment.

The multimodal service providing system 1 of the first embodiment is a system which provides service to be provided by a plurality of service servers in response to a request from terminal devices, as one multimodal service content integrated by integrated servers, to terminal devices. The multimodal service providing system 1 basically includes, as shown in FIG. 1, a terminal device 2 (hereinafter simply called a "terminal"), an integrated server 8, a plurality of service servers each providing a different service content, for example, service servers 12, 14, and 16. More specifically, the multimodal service providing system 1, as shown in FIG. 2, is made up of terminals 2, 4, and 6, integrated servers 8 and 10, a floor server 12, a voice transferring server 14, and a white board application server 16. Hereinafter, the example of the specified configurations of the multimodal service providing system 1 is described.

The above multimodal service represents communication service provided among a plurality of terminals. The example of the communication service provided here includes half-duplex voice speech service and white board sharing service. The half-duplex voice speech service to be provided here is the same as is known as PTT (Push To Talk) service. More specifically, the service to be provided by the servers 12, 14, and 16 described later is an example of each of service contents contained in the multimodal service. The multimodal service providing system 1 operates so that the integrated server 8 provides the above-described communication service to the terminals 2 and 4, and the integrated server 10 provides the above-described communication service to the terminal 6.

The terminals 2, 4, and 6 are terminals that use the multimodal service. A device for a floor client, a device for voice transmitting and receiving client, and a device for white board application client are installed in each of the terminals 2, 4, and 6. Each of the integrated servers 8 and 10 provides communication service (one of multimodal service contents) obtained by linking and integrating floor service, voice transferring service, and white board application service, to the terminals 2, 4, and 6.

Each of the integrated servers 8 and 10, as shown in FIG. 3, is made up of a session establishment processing section 20 and a service link processing section 30. The session establishment processing section 20, as shown in FIG. 4, is a processing section to establish a multimodal service session and includes an analyzing section 21, a first issuing section 12, a receiving section 23, and a second issuing section 24.

The analyzing section 21 is a processing section to receive and analyze a session establishing request in a message form from each of the terminals 2, 4, and 6. The session establishing request contains a description indicating that service to be provided by a plurality of service servers is to be used (described later in detail). The first issuing section 22 is a processing section to generate a session start request for every server in a format that can be interpreted by each of the service servers 12, 14, and 16 based on an analysis made by the analyzing section 21 and to issue the session start request to corresponding service servers 12, 14, and 16.

The receiving section 23 is a processing section to receive a response (response information) from each of the service servers 12, 14, and 16, that is, a session start request in a message form to be transferred to the terminals 2, 4, and 6.

The second issuing section 24 is a processing section to integrate each response received by the receiving section 23 and to issue the result from integration to the terminals 2, 4, and 6. The second issuing section 24, when integrating the responses received by the receiving section 23, since each of the service servers 12, 14, and 16 sends a response, with necessary timing for each of the service servers 12, 14, and 16, to the second issuing section 24, is put in a standby status. If there is the service server that sends back no response, the second issuing section 24 issues a response according to its own judgement, with no service being provided, to the terminals 2, 4, and 6.

The service link processing section 30, as shown in FIG. 5, includes a monitoring section 31, a determining section 32, an issuing section 33, and a storing section 34. The monitoring section 31 is a processing section to monitor control information of service to be provided by the service servers 12, 14, and 16, sent-out information output from the terminals 2, 4, and 6 which includes, for example, voice data, instruction for writing to a white board or a like. The control information includes state information of service. The determining section 32 is a processing section to determine a manner of service linking based on control information and sent-out information obtained by monitoring by the monitoring section 31, service linking conditions (hereafter called "policy information" or "policy") stored in the storing section 34, that is, based on how the service linking conditions are related to the control information and sent-out information. The service linking condition is predetermined so as to have a specified relation to the above control information and above sent-out information. The issuing section 33 is a processing section to issue information about a manner of service linking determined by the determining section 32 to service servers 12, 14, and 16 and terminals 2, 4, and 6 that require the information. The storing section 34 is a processing section to store policy information for service linking required for determining a manner of service linking by the determining section 32 and provides it to the determining section 32.

The session establishment processing section 20 and service link processing section 30 are sections to process programs which are stored in a nonvolatile storage (for example, in nonvolatile memory) of the integrated servers 8 and 10 and are read by a CPU (Central Processing Unit) or a processor into the volatile memory and executed by the CPU or processor. Thus, functions of each of the processing sections 20 and 30 are performed.

Moreover, in order to connect the service servers 12, 14 and 16 to a port of the integrated servers 8 and 10, it is necessary that information about the service servers 12, 14 and 16 is registered in advance on the integrated servers 8 and 10. The information includes an address of each of the service servers 12, 14, and 16, a kind (service name) of service to be provided by the service servers 12, 14, and 16, and information required for establishment of a session (that is, information to be transmitted by the integrated servers 8 and 10 to the service servers 12, 14, and 16 at time of establishment of the session).

The floor server 12 controls which terminal transmits media at a given time during a session being performed among a plurality of terminals, that is, the floor server 12 provides service to control provision of a floor-right (hereinafter, may referred simply to as a floor) to an allowable terminal in which contention of service of same kind is solved and contention of service caused by issuance of a plurality of floor requests is solved. The voice transferring server 14 provides service to transfer voice data transmitted by one terminal that is joining the session to other terminals that is also joining the session. The white board application server 16 provides service to allow a plurality of terminal users to see the same picture and/or photograph on each terminal screen or to write lines or characters on the picture and/or photograph.

Next, operations of the multimodal service providing system of the first embodiment are described by referring to FIGS. 2 to 7. First, operations to be performed prior to provision of communication service (one example of multimodal service) by the multimodal service providing system 1 are described by referring to FIG. 6. Moreover, in this embodiment, operations of signaling required for establishment of a session, for example, acknowledging operations for the session establishing request are performed by general known procedures and such the known procedure itself does not form the constitution of the present invention and, therefore, in order to simplify the descriptions, their one-by-one explanations are omitted. The establishment and termination of a session is performed by using, for example, an SIP (Session Initiation Protocol).

When the multimodal providing system 1 is configured, information (information described above) about the service servers 12, 14 and 16 to be connected to the integrated servers 8 and 10 is registered in advance on the integrated servers 8 and 10 to which the corresponding service servers are connected. Therefore, even after the multimodal service providing system 1 is connected once to a required service server, when multimodal service is to be provided by connecting other additional service server, only by registering information about the other service server, extended multimodal service additionally containing the service to be provided by the other service server can be provided. From the terminal 2 of the above multimodal service providing system 1, a session establishing request is issued to the integrated server 8 [see (1) in FIG. 6]. The request contains information about a start of the session establishment, for example, information for indicating the start of the session establishment in the session in which service to be provided by the service servers 12, 14, and 16 in the established session is utilized. Moreover, the request contains server selecting information that enables multimodal service integrated by linking the integrated server 8 to be provided to the terminals 2. The server selecting information may be, for example, an address of each of the service servers 12, 14, and 16 or may be a name of service to be provided by these service servers.

The integrated server 8 receives a session establishing request from the terminal 2 and issues a session start request to each of the service servers 12, 14, and 16 when multimodal service session (service session) in which the terminal 2 wishes to receive service from the service server 12, 14, and 16 is started. [see (2-1) (2-2), and (2-3) in FIG. 6]. The session start request contains the description that the terminal to join the multimodal service session is the terminals 2, 4, and 6.

In FIG. 6, these requests are shown by reference numbers (2-1), (2-2), and (2-3) and each of their branch numbers shows a request to be transmitted to the service servers 12, 14, and 16 and these requests are logically in the same order as requests that the integrated server 8 issues to each of the service servers 12, 14, and 16.

Each of the service servers 12, 14, and 16 receives a session start request from the integrated server 8 and, in order for the integrated server 8 to establish a session to be joined by the terminals 2, 4 and 6, issues a session start request to each of the terminals 2, 4, and 6. These session start requests are shown by reference numbers (3-1), (3-2), and (3-3). The session start requests (3-1), (3-2), and (3-3) are transmitted to the integrated servers 8 and 10 to which each of the terminals 2, 4, and 6 is connected.

The integrated server 8, when receiving a session start request to each of the terminals 2, 4, and 6 to be connected so as to operate under the control of the integrated server 8, issues a multimodal service session start request to each of the terminals 2, 4, and 6 [see (4) in FIG. 6]. By going through a series of steps described above, the multimodal service session is established [see (5) in FIG. 6].

Next, operations of providing multimodal service in a state in which the multimodal service session is thus established are explained. The operations of providing multimodal service are basically performed according to the SIP described above, however, the operations are not limited to this protocol.

As described above, in the state in which a communication circuit is formed between terminals 2, 4, and 6 joining the session and service servers 12, 14 and 16, multimodal service is started. The multimodal service is provided generally by following ways. That is, when multimodal service is provided and a given terminal is in a state in which the given terminal can acquire a floor-right, a floor-right can be acquired, a floor acquiring request for one service content making up the multimodal service reaches the floor server 12 from the terminal that can acquire the floor-right sequentially in time sequence through the integrated servers 8 and 10. The issue is made from one terminal in one case and from a plurality of terminals in another case.

When the floor acquiring request is issued from one terminal, if the floor server 12 does not yet provide the floor-right to any terminal, since no contention of the floor acquiring request of same type occurs in the floor server 12, the floor server 12 provides the floor-right (a right to speak in the multimodal service session) corresponding to the above floor acquiring request to the above one terminal. Moreover, when the floor acquiring request is issued, before and after, in time sequence from a plurality of terminals 2, 4, and 6, contention of the floor acquiring request s corresponding to the floor acquiring request in the floor server 12 occurs and, therefore, the contention is solved in a manner in which the floor-right is provided to any one of the terminals 2, 4, and 6 which is determined by processing performed according to known procedures in the floor server 12. That is, if a floor-right has been already issued to a preceding one of the terminals 2, 4, and 6, a floor-acquisition failure (floor-issuance rejection) notification is sent back to a following terminal that has transmitted a floor acquiring request in a manner to follow.

A floor acquisition success notification is transmitted from the floor server 12 to any one of the terminals 2, 4, and 6 to which the above floor-right is provided, while a notification (floor acquired notification) is transmitted to other terminals that did not make a request for the floor-right.

The floor acquisition success notification, floor-acquisition failure notification, and floor acquired notification are transmitted through the integrated servers 8 and 16 to the terminals 2, 4, and 6. In such the transmission of the notifications, the terminal that receives the floor acquired notification contains a terminal that receives the floor-acquisition failure notification. The floor-right acquired notification and floor-acquisition failure notification reach, with some time lag, terminals that receive both the notifications.

When each of the notifications described above reaches each of the terminals 2, 4, and 6, any one of the terminals 2, 4, and 6 that has acquired the floor-right comes to be able to transmit data (sent-out information from any one of the terminals 2, 4, and 6) to be provided to other terminals joining the multimodal service session to a corresponding one of the service servers 12, 14, and 16. Moreover, other terminals can recognize that any one of the terminals 2, 4, and 6 other than the self-terminal has acquired the floor-right.

Thus, when a plurality of service contents making up multimodal service having acquired the floor-right is being provided sequentially in time sequence, contention occurs among service contents of different types to be provided in some cases. The contention is solved in a manner in which services are processed by linking and each service making up the multimodal service is put in order and is then provided, as multimodal service, to each of the terminals 2, 4, and 6.

The linking processing is described below. Provision of service by each of the service servers 12, 14, and 16 is performed independently. Control information about service to be provided by each of the service servers 12, 14, and 16 and sent-out information to be transmitted (sent out) by each of the terminals 2, 4, and 6 are monitored by the monitoring section 31 of the service link processing section 30. The determining section 32 determines a manner of service linking by referring to a policy stored in the storing section 34 based on monitoring results. Information about the manner of service linking determined as above is transferred from the issuing section 33 to a corresponding one of the service servers 12, 14, and 16 and each of the terminals 2, 4, and 6.

Examples of processing in the service link processing section 30 are described below. For example, it is presumed here that a policy is set and stored in the storing section 34 for teleconferencing service that a voice speech transferring right being a floor-right for a group voice speech and a writing right being a floor-right for the white board are provided to the same terminal and the white board writing right follows the floor-right for voice speech. This setting is done, for example, in advance.

Under these conditions, if, contention of floor acquiring request s for voice speech, for example, for service of same types is processed by the floor server 12 and the floor-right for the voice speech is provided to a given terminal and a writing instruction is transmitted from the given terminal to the white board application server 16, the monitoring section 31 monitors the given terminal's acquisition of the floor-right for voice speech. At this time point, a state occurs in which the white board writing-right is provided to the same terminal and, therefore, if, during a time period in which the acquisition of the voice speech floor-right is maintained by the terminal, the monitoring section 31 has monitored to find the white board writing instruction fed from the terminal, the determining section 32 determines a manner of service linking in which the white board writing instruction is provided to same terminal after checking up the above policy to confirm agreement with the policy content that "the same terminal has both the voice speech transferring-right and writing-right". Information about the manner of service linking is transferred to the white board application server 16 from the issuing section 33.

In the example employed in the above teleconferencing service, if the monitoring section 31 has monitored to find a given terminal's acquisition of a floor-right for voice speech, a state in which a white board writing instruction is provided to the same terminal occurs at this time point and, therefore, if, during a time period in which the acquisition of the voice speech floor-right is maintained by the same terminal, the monitoring section 31 has monitored to find a white board writing instruction fed from other terminal, the determining section 33 determines, after checking up the above policy to confirm non-agreement with the policy content that "the same terminal has the voice speech transferring right and writing right", a manner of service linking in which information about the white board writing is not provided to other terminal (or, a manner of service linking in which the terminal having issued the above white board writing instruction holds the writing instruction until the terminal next acquires the floor-right for voice speech). The information about the manner of the service linking is also transferred to the white board application server 16 from the issuing section 33.

Also, if, as an example in which there is no subordinate relation between the floor-right for voice speech and the white board writing-right, a policy is set that "the floor-right for group voice speech and white board writing right are provided to the same terminal", when a given terminal has monitored to find the given terminal's acquisition of the floor-right for voice speech, a state occurs in which the same terminal is in a position to make a request for the white board writing-right and, if the white board writing-right request is made by the same terminal, the determining section 32 determines, after checking up the above policy to confirm agreement with the policy content that "the same terminal has both the voice speech transferring right and writing-right", a manner of service linking in which "the request for writing-right is accepted, that is, the floor-right for service of the white board application server is provided to the terminal, however, if other terminal makes a request for the white board writing right, the request is rejected". The information about the manner of service linking is transferred to the white board application server 16 from the issuing section 33.

Moreover, if there is no subordinate relation between a floor-right for voice speech and white board writing-right in the teleconferencing service, in an example in which requests for the floor-right for voice speech and white board writing-right are simultaneously issued (hereinafter called the "above example"), if a policy is set that "the floor-right for group voice speech and white board writing-right are provided to the same terminal", when a given terminal has monitored to find the acquisition of the white board writing-right and a different terminal has monitored to find the acquisition of the white board writing-right, the determining section 32 determines, after checking up the above policy, a manner of the service linking in which "the acquisition of both the floor-rights is nullified". More specifically, the determining section 32 determines to provide an instruction for a request for releasing both the floor-rights to both the terminals.

In the above example, as other example of the manner of service linking, when a given terminal has monitored to find the acquisition of the floor-right for voice speech, "even if the same terminal makes no request for the white board writing-right, the integrated servers 8 and 10, instead of the same terminal, make a request for the white board writing-right and acquires the same".

Also, it is here presumed that, in TV (Television) telephone service, a policy is set and stored in the storing section 34 that "a voice speech transferring right being a floor-right for group voice speech and an image transmitting right of a video image picked up by a video camera are provided to the same terminal". Under these conditions, if, contention of a floor acquiring request for voice speech, for example, for service of same types (for example, voice speech) is processed by the floor server 12 and the floor-right for the voice speech is provided to a given terminal and, if a video image is transmitted to the image transferring server (the server can be connected to the integrated servers 8 and 10 as with the other service servers) from the given terminal, the monitoring section 31 has monitored to find the given terminal's acquisition of the floor-right for voice speech and, at the same time, the monitoring section 31 also has monitored to find the transmission of a video image from the same terminal, the determining section 32 determines, after checking up the above policy to confirm agreement with the policy content that "the same terminal has the voice speech transferring right and image transmitting right", a manner of service linking in which a video image can be provided to same terminal. The information about the manner of service linking is transferred to the image transmitting server (not shown) from the issuing section 33.

In the example of the policy employed in the above TV telephone service, if the monitoring section 31 has monitored to find that a given terminal acquires the floor-right for voice speech and, at the same time, if the monitoring section 31 has monitored to find a video image fed from other terminal, the determining section 32 determines, after checking up the policy to confirm no agreement with the policy content that "the same terminal has the voice speech transferring right and image transmitting right", a manner of service linking so that the video image is not provided to other terminal. The information about the manner of the service linking is transferred to the image transferring server (not shown) from the issuing section 33.

Also, in the TV teleconferencing service, the service linking by policy control as employed in the above two examples can be provided in a combined manner. Moreover, multimodal service can be provided by using not only the policies employed in the above examples but also other various polices corresponding to the multimodal service to be provided.

By performing such the linking processing as described above, each service making up multimodal service can be provided as new service integrated by linking the integrated servers 12 and 14, that is, as multimodal service, to each of the terminals 2, 4, and 6 joining a session.

Then, when any one of the terminals 2, 4, and 6 to which the above multimodal service has been provided and which has acquired the floor-right for given service frees up the floor-right, a request for freeing up the floor-right is issued which reaches the floor server 12 through one of the integrated servers 8 or 10 to the floor server 12. The floor server 12 notifies all terminals 2, 4, and 6 that all the floor-rights have been freed up. When the floor-right of each service making up the multimodal service is thus freed up, the multimodal service session that had been opened is terminated.

A specified example of the teleconferencing service described above is described below by referring to FIG. 7. Now it is presumed that the terminal 2 has issued a request for acquiring a floor-right [see (6a) in FIG. 7]. The floor acquiring request reaches the floor server 12 through the integrated server 8. The floor server 12 provides a floor-right to the terminal 2 if there is no terminal having acquired the floor-right at that time and issues a floor acquired notification to notify all terminals (terminals 2, 4 and 6) joining the session that the floor-right has been provided to the terminal 2 [see (6b) in FIG. 7]. The floor acquired notification [see (6b) in FIG. 7] is transferred to a corresponding one of the terminals 2, 4, and 6 through the integrated servers 8 and 10 to which each of the terminals 2, 4, and 6 is connected individually. By this, a state occurs in which the terminal 2 has the session floor-right at this time point.

The terminal 2 to which the floor-right has been provided as above can access service provided by the service servers 14 and 16. In the embodiment (FIG. 2), the service server 14 provides service of transmitting voice data (7a) and the service server 16 provides service of issuing an instruction (8a) for operating an image shared by the white board application.

Voice data and/or image operating instruction output from the terminals 2, 4, and 6 are transferred to a corresponding one of the service servers 14 and 16 through the integrated server 8. Thereafter, the voice transferring server 14 transfers voice data (7a) to other terminals that join a session (7b) and the white board application server 16 transfers an image operating instruction (8a) to other terminals that join the session (8b)

In a state in which such the floor-right as described above is provided to the terminal 2, if, for example, the terminal 6 issues a writing instruction to the white board application server 16, the monitoring section 31 of the integrated server 8 monitors the above-described writing instruction and control information of the floor server 12 and has recognized that the terminal already having acquired the floor-right at that time is the terminal 2 and, therefore, if a policy, for example, that "the floor-right has been provided to the terminal 2 and, if the writing instruction is issued from the terminal 6, the writing instruction is not transferred to the white board application server 16" is stored in the storing section 34, the determining section 32 determines, after checking up the policy, that the writing instruction is not transferred to the white board application server 16 from the issuing section 33 of the integrated server 10.

After the session is thus established and provision of required service contained in the multimodal service is completed, when a floor freeing-up request (10a) is issued from any one of the terminals 2, 4, and 6, as in the case of the floor acquiring request (6a) described above, the floor freeing-up request is processed and floor freeing-up notification is transferred to all the terminals 2, 4, and 8 joining the session from the integrated server 8 (10b) and a state occurs in which any of the terminals 2, 4, and 6 has no floor-right. When the floor-right for each service making up the multimodal service is thus freed up, the multimodal service session that has been opened is terminated.

Thus, according to the configurations of the first embodiment, at the time of provision of multimodal service, after the specified information about the service server is registered on the integrated server, a session start request, that is, a service using request from terminals is distributed on the service server by the session establishment processing section and service to be provided by the server on which the above request has been distributed is linked by the service link processing section and is integrated and, therefore, mutual dependence on software among the terminals and service servers is almost removed, which enables flexible combination among a plurality of already-existing service contents and new service contents, in other words, which enables the addition of new service to become easy at time of integration of new service among a plurality of already-existing service contents and new service contents.

Moreover, as described above, a multimodal service session is established between a terminal that wants to receive multimodal service at an integrated server and a service server that provides service and each service for the multimodal service is integrated in a linked manner by an integrated server, new service obtained by integration of a plurality of service contents can be provided. Moreover, a session establishing request to be transmitted from a terminal to an integrated server describes a message that a plurality of service contents is used and it is, therefore, made possible to simultaneously make a request for a plurality of service contents.

Also, as explained above, individual service is linked and integrated (coordinated) by individual integrated server and, as a result, service quality for users can be improved compared with the case in which each terminal uses individual service. Moreover, a plurality of servers that provide the same service in a network can be mounted, which makes load sharing easy. By easy addition of service servers, it is made possible to easily introduce new service.

Second Embodiment

Figure 8:
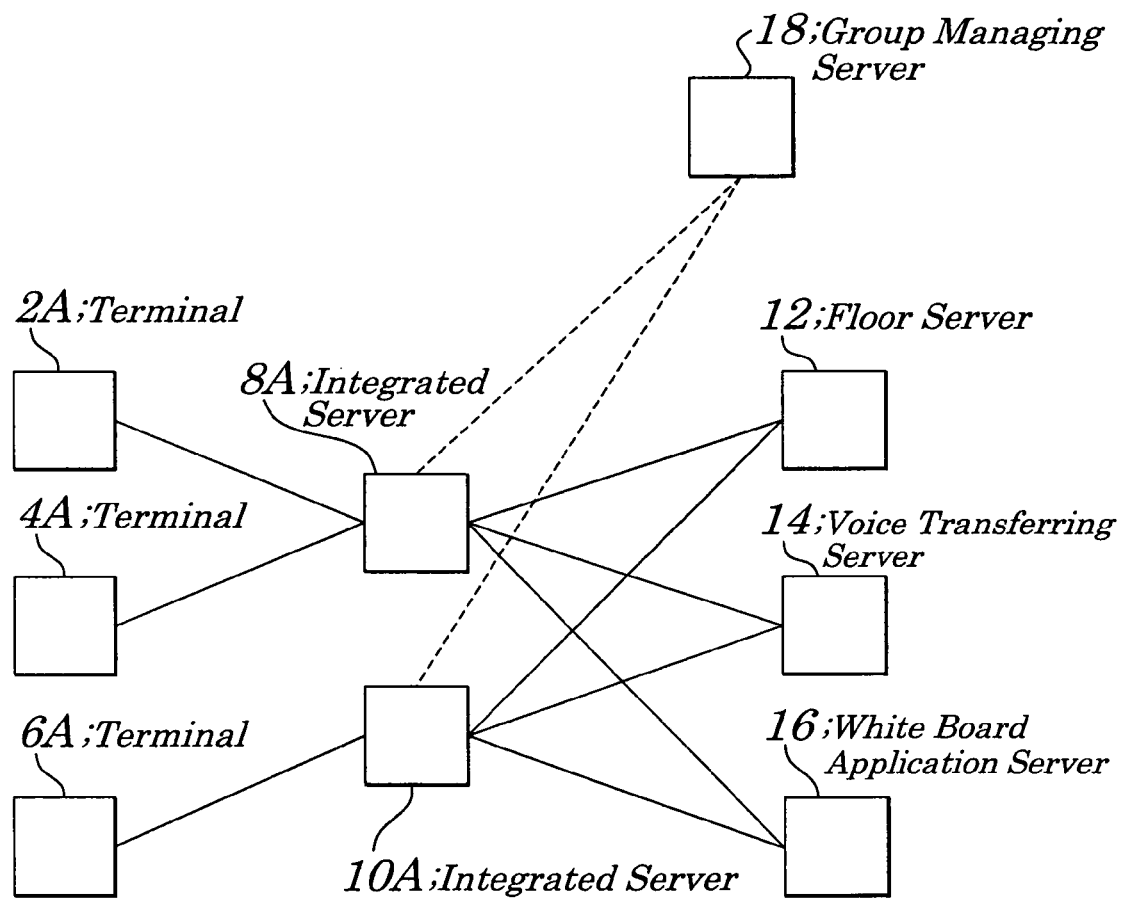
FIG. 8 is a diagram showing basic configurations of a multimodal service providing system according to a second embodiment of the present invention.

FIG. 8 is a diagram showing basic configurations of a multimodal service providing system of a second embodiment of the present invention. Configurations of the multimodal service providing system of the second embodiment differ from those of the first embodiment in that designation of a session joining terminal contained in a session start request for multimodal service is confirmed according to a group ID (Identifier) and an integrated server that receives the session start request inquires of a group managing server about the session joining terminal by using the group ID. That is, as shown in FIG. 8, in the multimodal service providing system 1A of the second embodiment, a group managing server 18 is newly connected to the integrated servers 8A and 10A. Operations of the terminals 2A, 4A, and 6A, integrated servers 8A and 10A, and group managing server 18 are as follows.

Any one of the terminals 2A, 4A, and 6A is so configured as to write, when a session establishing request is issued, a group ID of a terminal joining the session, for example, the group ID to identify the terminals 2A, 4A, and 6A into the session establishing request and sends out the session establishing request to a corresponding one of the integrated servers 8A and 10A. Moreover, all the integrated servers 8A and 10A are configured so as to inquire of the group managing server 18 by using a group ID written in the session establishing request to be transmitted from a terminal at time of establishment of a session and to recognize each of terminals of the group identified by the group ID and, based on the result, to issue a session start request to each of the service servers 12, 14, and 16.

Then, the group managing server 18 is so configured as to send back, in response to the inquiry made by each of the integrated servers 8A and 10A, information about identification of a terminal of the group designated by the group ID to each of the integrated servers 8A and 10A. The configurations other than described above are the same as those of the first embodiment and same reference numbers are assigned to components having the same functions as those of the first embodiment and their descriptions are omitted accordingly.

Next, operations of the multimodal service providing system of the second embodiment are described by referring to FIG. 8. As is apparent from the above description, contents of the session establishing request issued by, for example, the terminal 2A in the second embodiment are different from those in the first embodiment. That is, in the second embodiment, each of the terminals joining a session is merged, in advance, into a group and its group ID is written in the session establishing request.

When a session establishing request is issued from a terminal that wants to receive multimodal service, for example, from the terminal 2A, the integrated servers 8A and 10A having received the session establishing request inquiries of the group managing server 18 by using the group ID described in the session establishing request. The group managing server 18 sends information about identification of a terminal discriminated by the group ID back to the integrated servers 8A and 10A.

The integrated servers 8A and 10A having received a reply of information about a terminal that wants to receive multimodal service, by the same way as described in the first embodiment, issue the session start request to each of the service servers 12, 14, and 16 to perform session establishing processing for provision of the multimodal service. After completion of the establishment of the session of the multimodal service, the same operations as described in the first embodiment are performed between the terminal joining the session and each of the service servers 12, 14, and 16.

Thus, according to the second embodiment, by making the integrated server inquiry of the group managing server about the identification of a terminal discriminated by the group ID written in the session establishing request issued by the terminal, the same effect obtained in the first embodiment can be achieved by the second embodiment.

Third Embodiment

Figure 9:
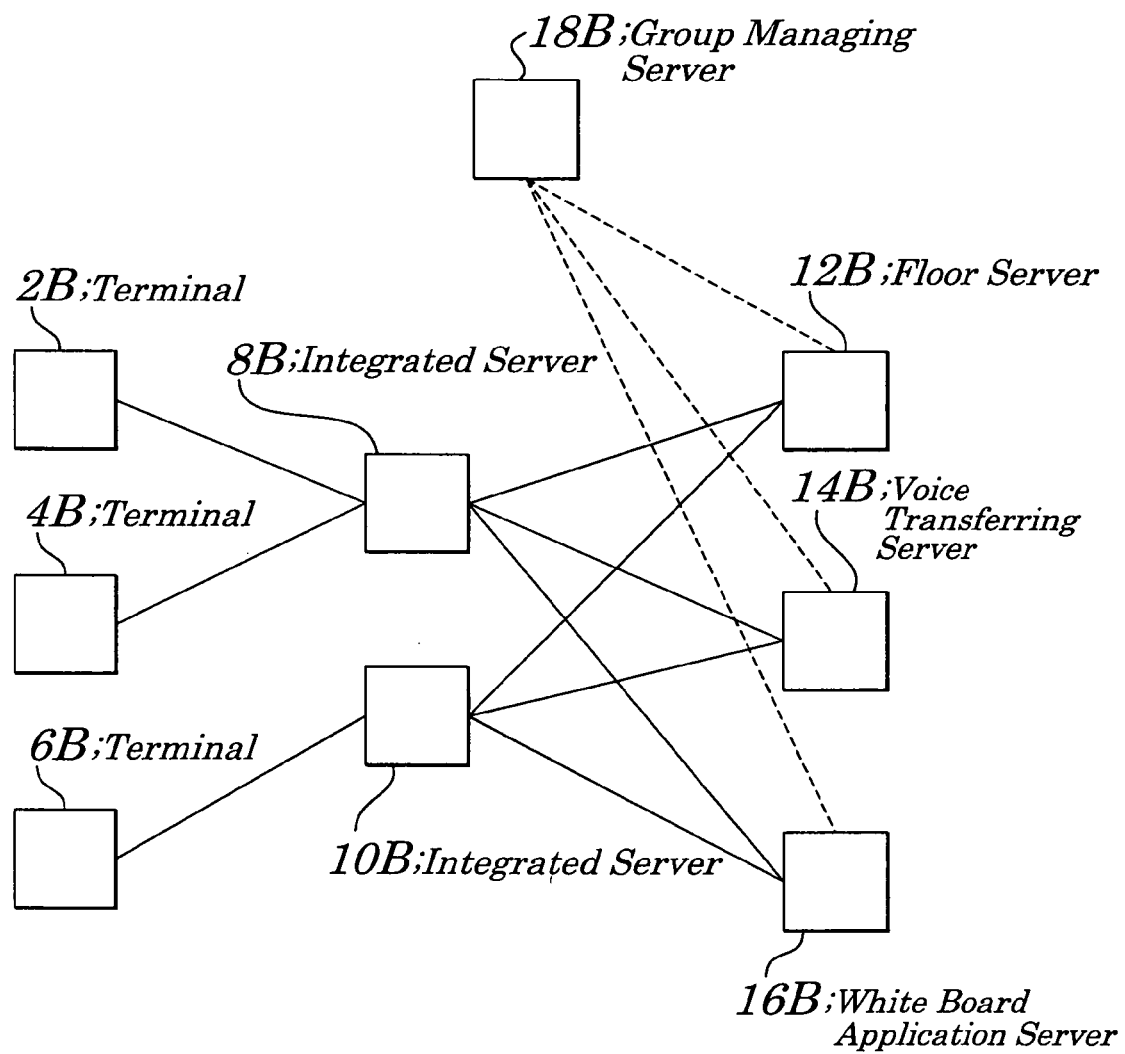
FIG. 9 is a diagram showing configurations of a multimodal service providing system according to a third embodiment of the present invention.

FIG. 9 is a diagram showing configurations of multimodal service providing system according to a third embodiment of the present invention. Configurations of the third embodiment differ from those of the first embodiment in that a terminal to join a session for a session start request is designated by a group ID and the integrated server issues the session start request to the service servers and the service servers inquiries of the group managing server about a terminal that joins a session by using the group ID.

That is, in the multimodal service providing system 1B of the embodiment, as shown in FIG. 9, the group managing server 18B is connected to the service servers 12B,14B, and 16B and, when an inquiry about each of terminals 2B, 4B, and 6B joining a session is made from the service servers 12B, 14B, and 16B by using the group ID, the group managing server 18B sends back a reply to the inquiry to each of the service servers 12B, 14B, and 16B.

To achieve this, each of the terminals 2B, 4B, and 6B issues a session establishing request in which a group ID to identify a terminal joining the session is written. The integrated servers 8B and 10B receive the session establishing request from the terminals 2B, 4B, and 6B and issue a session start request to each of the service servers 12B, 14B, and 16B. Each of the service servers 12B, 14B, and 16B having received the session start request inquires of the group managing server 18 about each of terminals 2B, 4B, and 6B to be identified by the group ID described in the session start request to recognize each of the terminals 2B, 4B, and 6B that joins the session. The configurations other than described above are the same as those of the first embodiment and same reference numbers are assigned to components having the same functions as those of the first embodiment and their descriptions are omitted accordingly.

Next, operations of the multimodal service providing system 1B of the third embodiment are described by referring to FIG. 9. As is apparent from the above descriptions, the multimodal service providing system 1B of the third embodiment differs from those of the first embodiment in contents of a session establishing request to be issued by a terminal, for example, by the terminal 2B. That is, in the third embodiment, the terminals 2B, 4B, and 6B that join the session are merged into a group and its group ID is written in the session establishing request.

When the session establishing request is issued by any one of the terminals 2B, 4B, and 6B that wants to receive multimodal service, for example, by the terminal 2B, the session establishing request is issued with a group ID described in the session establishing request. The integrated servers 8B and 10B having received the session establishing request, by using the group ID described in the session establishing request, issue a session start request to the service servers 12B, 14B, and 16B.

The service servers 12B, 14B, and 16B inquire of the group managing server 18B about any one of the terminals 12B, 14B, and 16B identified by the group ID. The group managing server 18 sends a reply to the inquiry to the service servers 12B, 14B, and 16B. The service servers 12B, 14B, and 16B issue a multimodal service session start request to the integrated servers 8B and 10B to which the any one of the terminals 12B, 14B, and 16B designated by the above replay is connected.

By performing the above procedures, the multimodal service session is established and a communication session is started among the terminals 12B, 14B, and 16B. The operations to be performed in the multimodal service session are the same as in the first embodiment and their description is omitted accordingly.

Thus, according to the third embodiment, by making the service server inquiry of the group managing server about the identification of a terminal discriminated by the group ID written in the session establishing request issued by the terminal, the same effect obtained in the first embodiment can be achieved by the third embodiment.

Fourth Embodiment

Figure 10:
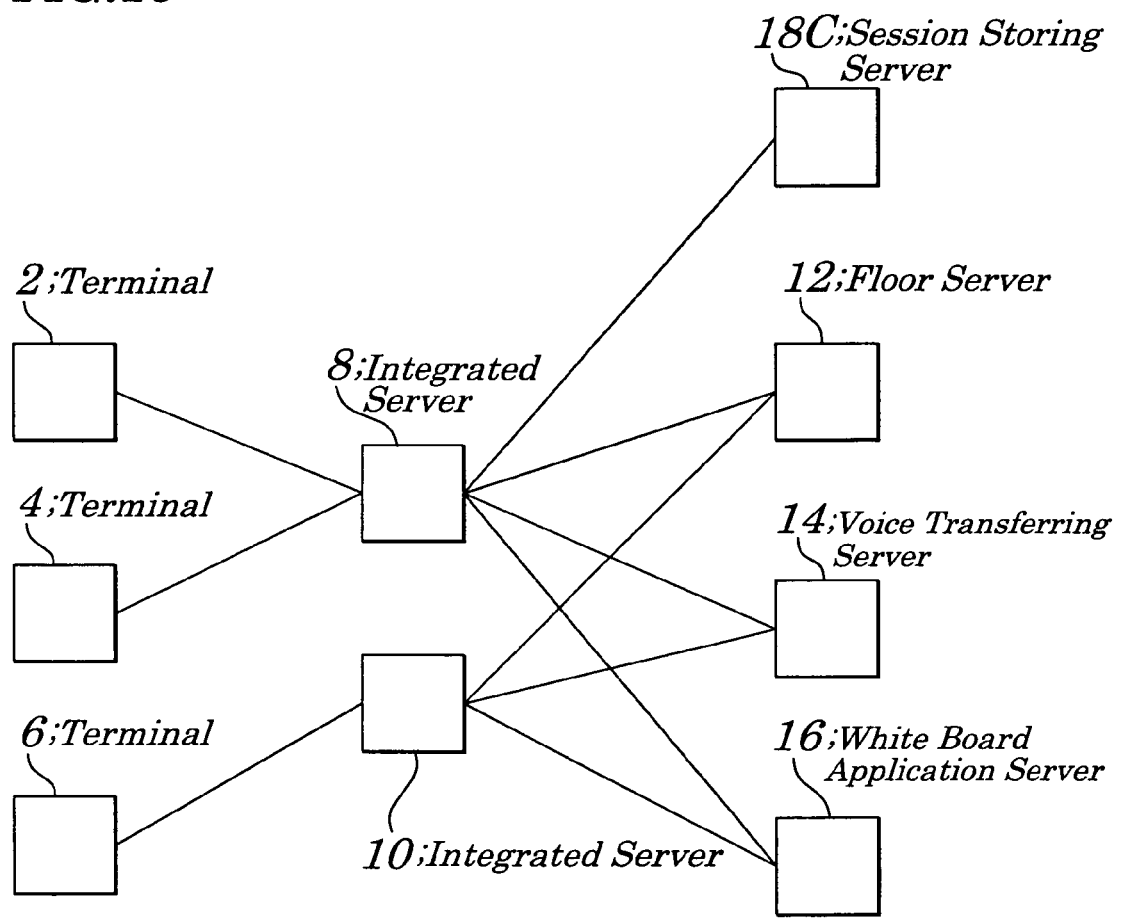
FIG. 10 is a diagram showing configurations of a multimodal service providing system according to a fourth embodiment of the present invention.
Figure 11:
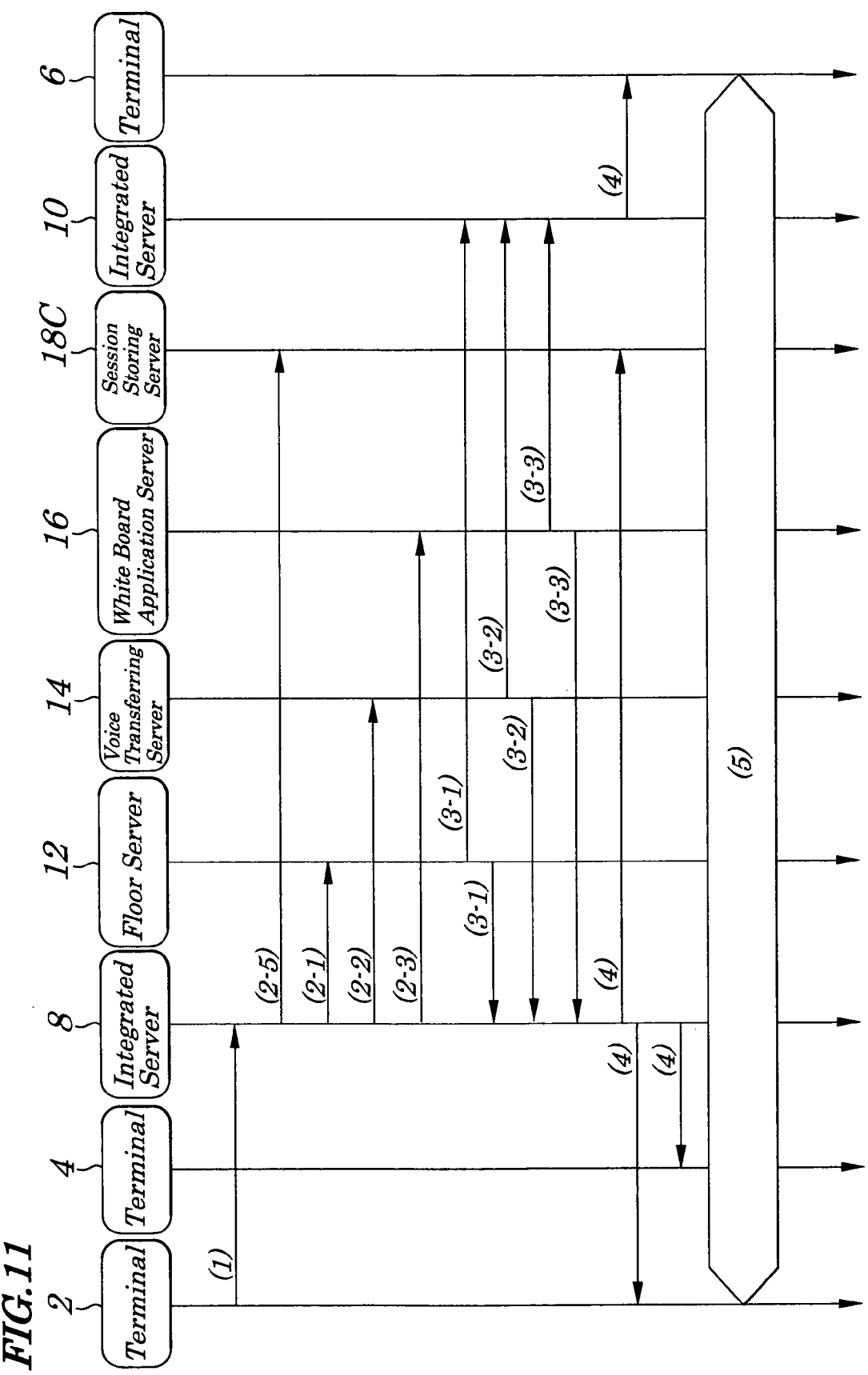
FIG. 11 is a timing chart occurring at time of establishing a session in the multimodal service providing system according to the fourth embodiment of the present invention.
Figure 12:
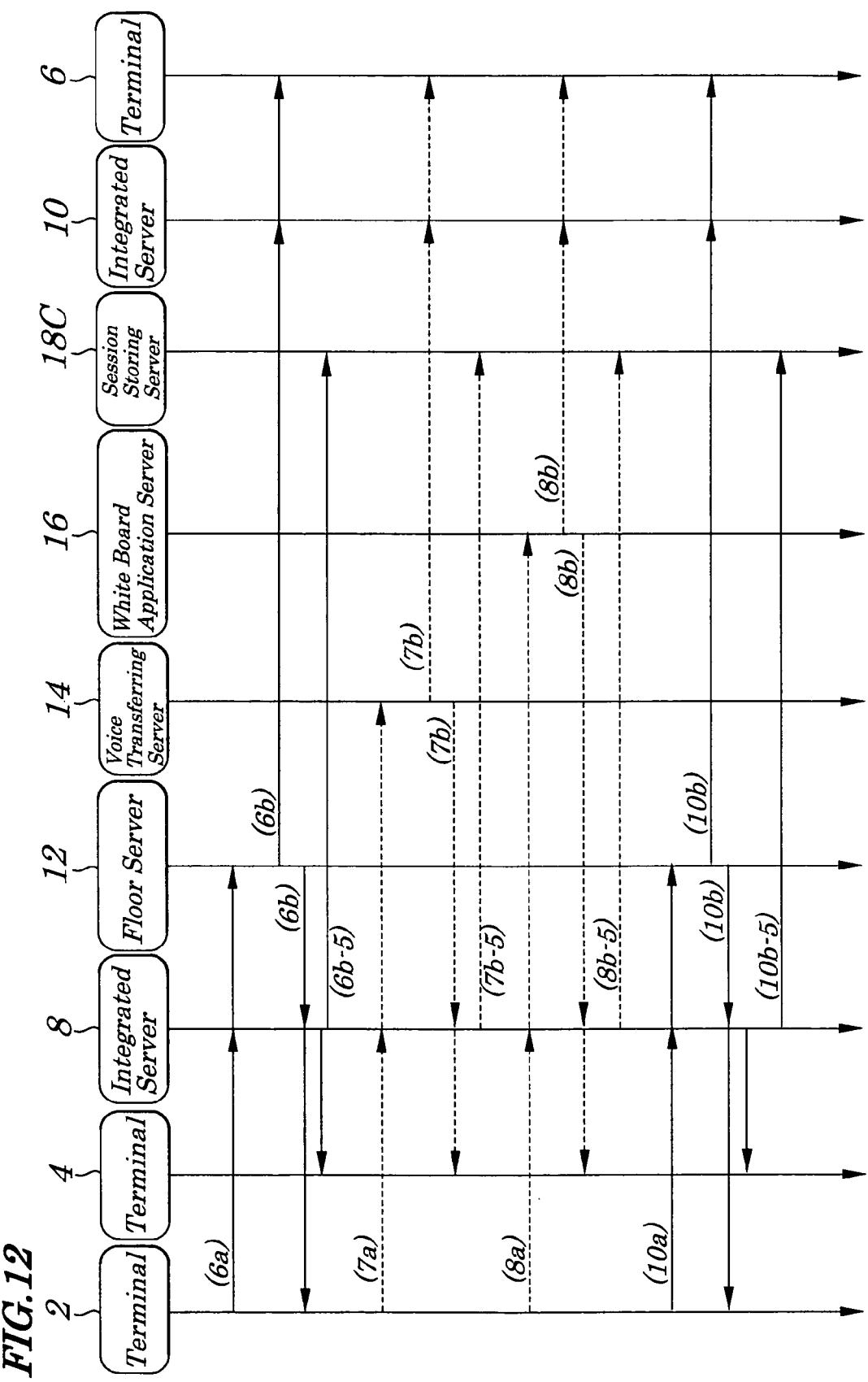
FIG. 12 is a timing chart occurring during a session in the multimodal service providing system according to the fourth embodiment of the present invention.

FIG. 10 is a diagram showing configurations of a multimodal service providing system of a fourth embodiment of the present invention. FIG. 11 is a timing chart occurring at time of establishing a session in the multimodal service providing system of the embodiment. FIG. 12 is a timing chart occurring during a session in the multimodal service providing system of the embodiment.

Configurations of the multimodal service providing system of the fourth embodiment differ greatly from those of the first embodiment in that contents of a session of multimodal service can be recorded and stored and session contents can be referred to. That is, in the multimodal service providing system 1C of the fourth embodiment, as shown in FIG. 10, the session storing server 18C is connected to the integrated server 8 and, in response to an inquiry about a session content from the terminals 2 and 4, a session content stored in the session storing server 18C is sent back to the terminals 2 and 4. The configurations other than described above are the same as those of the first embodiment and same reference numbers are assigned to components having the same functions as those of the first embodiment and their descriptions are omitted accordingly.

Next, operations of the multimodal service providing system 1C of the fourth embodiment are explained by referring to FIGS. 10 to 11. First, operations to be performed prior to provision of communication service by the multimodal service providing system 1C at time of establishment of a session are described by referring, to FIG. 11. Moreover, in the fourth embodiment, signaling required for session establishment, for example, an acknowledgement operation for a request for the session establishment or a like are the same as in the first embodiment and, to simplify the description, in their descriptions of operations, its one-by-one explanation is omitted accordingly.

When the multimodal service providing system 1C described above is configured, the session storing server 18C is connected to the integrated server 8, however, at time of the connection, information (information explained in the first embodiment) about the server 18C is registered, in advance, on the integrated server 8.

Thus, after the multimodal service providing system 1C is constructed, a session establishing request is issued from the terminal 1 to the integrated server [(1) in FIG. 11]. The session establishing request contains information about the start of session establishment, for example, information indicating the start of establishment of a session in which service provided by the service servers 12, 14, 16 and the server 18C is to be used in the established session.

Also, the above session establishing request contains server selection information which enables the integrate servers 8 and 10 to provide multimodal service obtained by linking and integration to the terminals 2, 4 and 6. As the server selection information, an address of each of the service servers 12, 14, 16 and the server 18C or a name of service to be provided by these service servers 12, 14, 16 and the server 18C may be used. Based on, for example, a name of service, the integrated server 8 selects an appropriate service server.

The integrated server 8 receives a session establishing request from the terminal 2 and, to start the multimodal service session (service session) so that desired service to be provided by the service servers 12, 14, 16 and the server 18C can be received, issues a service session start request to each of the service servers 12, 14, and 16 [see (2-1), (2-2), (2-3), and (2-5) in FIG. 11]. The branch numbers of the reference numbers (2-1), (2-2), (2-3), and (2-5) shown in FIG. 11 indicate requests to be transmitted to each of the service servers 12, 14, 16, and the server 18C and these requests are logically in the same order as requests to be issued by the integrated server 8 to each of the service servers 12, 14, 16 and the server 18C.

The session start request (2-5) to be issued to the session storing server 18C contains information showing that terminals to join the session are terminals 2, 4, and 6 and information showing that the type of service to be stored by the session storing server 18C in this session is service to be provided by the floor server 12, voice transferring server 14, and white board application server 16. Also, in the session start request to be issued to the service servers 12, 14, and 16, information is described that the terminals to join the multimodal service session are the terminal 2, terminal 4, terminal 6, and session storing server 18C. Therefore, the session storing server 18C looks as one terminal when seen from the service servers 12, 14, and 16.

The service servers 12, 14, and 16 receive a session start request from the integrated server 8 and the integrated server 8, in order to establish a session that the terminals 2, 4, 6 join, issues a session start request to each of the terminals 2, 4, and 6. These requests are shown respectively as reference numbers (3-1), (3-2), and (3-3). The session start requests (3-1), (3-2), and (3-3) are transmitted to the integrated servers 8 and 10 to which each of the terminals 2, 4, and 6 is connected.

The integrated servers 8 and 10, when receiving the session start request to the terminal to be connected so as to operate under the control of the integrated servers 8 and 10, issues a multimodal service session start request to each of the terminals 2, 4, and 6 and to the session storing server 18C [see (4) in FIG. 11]. By going through a series of steps described above, the multimodal service session is established [see (5) in FIG. 11].

A specified example of the multimodal service session established as described above and employed in the teleconferencing service is explained by referring to FIG. 12. It is now presumed that the terminal 2 issues a request for acquiring a floor-right [see (6a) in FIG. 12]. The floor acquiring request reaches the floor server 12 through the integrated server 8. The floor server 12 provides a floor-right to the terminal 2 if there is no terminal having acquired the floor-right at that time and issues a floor acquired notification to notify all terminals (terminals 2, 4, 6 and 18C) that join the session that the floor-right has been provided to the terminal 2 [see (6b), (6b-5) in FIG. 12]. The floor acquired notification [see (6a) in FIG. 12] is transmitted to a corresponding one of the terminals 2, 4, and 6 through the integrated servers 8 and 10 to which each of the terminals 2, 4, and 6 is connected and the floor acquired notification [see (6b-5) in FIG. 12] is transferred to the session storing server 18C from the integrated server 8. By doing this, a changed state occurs in which the terminal 2 has the session floor-right at this time point.

The terminal 2 to which a floor-right is thus provided is allowed to access service to be provided by the service servers 14 and 16. In the configurations of the embodiment (FIG. 10), the service to be provided by the service server 14 is transmission of voice data (7a) and the service to be provided by the service server 16 is provision of an operating instruction (8a) of an image being shared according to a white board application. The voice data and/or image operating instruction output from the terminals 2 and 4 are transferred through the integrated server 8 to corresponding service servers 14 and 16. Thereafter, the voice transferring server 14 transfers voice data (7a) to other terminals that join the session (7b) and the white board application server 16 transfers an image operating instruction (8a) to other terminals that join the session (8b). The integrated server 8 transfers voice data and image operating instruction for recording and storing to the session storing server 18C. The voice data is shown by the reference number (7b-5) in FIG. 12 and the image operating instruction by the reference number (8b-5) in FIG. 12.

While a session is being established and desired service making up the multimodal service is being provided, contents of the session are stored sequentially by the session storing server 18C. After the provision of the multimodal service is complete, each of the terminals 2, 4, and 6 issues a floor freeing-up request (10a) and the floor freeing-up request is processed by the same method as employed in the case of processing the above floor acquiring request (6a) and a floor freeing-up notification (10b) is transferred from the integrated server 8 to all the terminals 2, 4, and 6 that are joining the session and, as a result, a changed state occurs that any one of these terminals 2, 4, and 6 has no floor-right. When the floor-right for each service making up the multimodal service is thus freed up, the opened multimodal service session ends.

Thus, in the fourth embodiment, the same effects as obtained in the first embodiment can be achieved. The configurations of this embodiment allow contents of multimodal service session to be disclosed or opened and, therefore, devices joining the multimodal service session or other users who want to know contents of the session, having a right to refer to the contents of multimodal service session can refer to stored contents of session.

It is apparent that the present invention is not limited to the above embodiments but may be changed and modified without departing from the scope and spirit of the invention. For example, in the above embodiments, the floor server, voice transferring server, white board application server are described as examples of service servers, however, the multimodal service providing system may be so configured that other servers to be used for provision of the multimodal service may be connected to the integrated servers to provide the multimodal service.

In the above embodiment, the policy is set in advance, however, ex post facto setting may be applicable. Also, each of the policies described in the above embodiment is an example for determination of a manner of service linking and is not limited to the above examples, that is, an appropriate policy may be prepared according to service to be linked to provide multimodal service. For example, since the voice transferring service follows the floor service, only the terminal that has acquired a floor-right is allowed to transmit voice data; however, in the white board application service, an image operating instruction may be exchanged independently without following the floor service.

The above embodiments describe that protocol to be used mainly is the SIP, however, the multimodal service providing system cannot be configured by using a specified protocol only. That is, by using other protocols, for example, RTCP (Real-Time Control Protocol), the multimodal service providing system may be configured.

Also, the above embodiments explains that the terminal is connected to the integrated server simply by a communication circuit. However, the connection between the terminal and integrated server may be established when a user of the terminal signs a service contract with a multimodal service provider. If the terminal is a mobile terminal, the terminal may be connected to a nearest integrated server in a network.

Moreover, in the above embodiments, service information is transmitted or received among the terminals, integrated servers, and service servers via the same communication circuit, however, service information, for example, information other than session establishment information and linking control information may be transmitted or received via a communication circuit other than used for transmission or receipt of the above session establishment information and linking control information.

Furthermore, the disclosed multimodal service session establishing method, multimodal service session establishing device, multimodal service providing method and multimodal service providing system can be applied to various types of communication systems.

What is claimed is:

1. A multimodal service session establishing method to be used in a multimodal service session establishing system, the multimodal service session establishing method comprising:
   providing to the multimodal service session establishing system, service servers of a plurality of types each providing a different communication service content;
   providing to the multimodal service session establishing system, a plurality of terminal devices to be connected to two or more of the service servers selected out of the service servers of the plurality of types, through at least one integrated server, thereby joining a multimodal service session;
   providing to the multimodal service session establishing system, the at least one integrated server installed between each of the terminal devices and two or more of the service servers selected and between the plurality of the terminal devices, and integrating and coordinating different communication services to be provided in real time by the two or more of the service servers through a network, without integrating the two or more of the service servers;
   a process in which any given terminal device issues a session establishing request to the integrated server so that the session establishing request contains group identifying information for identifying the terminal devices that join the multimodal service session, and server selection information for selecting the two or more of the service servers out of the service servers of the plurality of types;
   a process in which the integrated server issues a first session start request to the two or more of the service servers selected, based on the server selection information contained in the session establishing request;
   a process in which the two or more of the service servers issue response information to the first session start request and return the response information to the integrated server;
   a process in which, when the integrated server receives the response information from the two or more of the service servers, the integrated server issues a second session start request to the terminal devices identified by the group identifying information, whereby the multimodal service session is established between the service servers and the terminal devices through the integrated server and a group communication is started between the terminal devices through the integrated server;
   a process in which the integrated server monitors, after the multimodal service session is established, state information representing states of the communication service to be provided by the service servers and sent-out information fed from the terminal devices when the integrated communication services are to be provided;
   a process in which the integrated server determines a manner of linking of the communication services, based on results from the monitoring and service linking conditions set in advance;
   a process in which the integrated server makes the communication services be linked based on the determined linking manner; and
   a process in which the integrated server provides the linked and integrated communication services to the terminal devices.

* * * * *